United States Patent Office 3,822,216
Patented July 2, 1974

3,822,216
ACID OR MINERAL ANION STABILIZATION OF SILICA SOLS
David P. Schaefer, Hinsdale, Ill., assignor to Nalco Chemical Company, Chicago, Ill.
No Drawing. Filed Sept. 29, 1972, Ser. No. 293,691
Int. Cl. B01j 13/00; C01b 33/14
U.S. Cl. 252—313 S                    5 Claims

ABSTRACT OF THE DISCLOSURE

In the stabilization of highly concentrated sols of the silica type ranging from 35–50% concentration, which have been subjected to sequential double deionization through cationic and anionic beds, the addition to the sol of a small amount of an anion of an inorganic acid amounting to 0.01 to 0.15 weight percent of the anion based upon a 50% silica sol product. The specific anion is selected from sulfuric, phosphoric, hydrochloric, and nitric and is added directly or obtained by utilization of impurities in the silica sol and omission of anion bed treatment. The stabilization effectively prevents gelation during subsequent alkalization as in the preferred ammoniation.

---

In modern technology of silica sol preparation the emphasis has been towards the concentration of the sol to higher and higher concentrations of silica and with the increase of concentrations now ranging from 35–50% commercially, there has been also a problem of the preservation of the commercial value of the sols by stabilizing these concentrated sols to prevent gelation or partial gelation as evidenced by cloudiness. One commercial procedure for preparation of concentrated silica sol is described in 3,342,747 Mindick et al. (Nalco) where a double deionization or sequential treatment by cationic then anionic beds is described and the preparation and stabilization of concentrated sols is described. This patent points out that (column 5) the process "allows the final deionization step of the invention to remove completely all vestiges of ionic components present thereby producing an ion free acidic sol of high purity and stability" and later that the acidic pH is derived from acidic surface sites of the colloidal silica particles. The teachings of Mindick are incorporated by reference here and it is a special purpose of the present invention to proceed from the Mindick products and to stabilize these sols by addition of regulated amounts of amino so that during subsequent ammoniation the problem of viscosity and gelation especially during the ammoniation process will be minimized. Realkalization may be made by other desired cations such as lithium, etc.

With relation to addition of acid anions, the art is replete with contra indication of the present development as noted by the necessity of freeing sol from anionic impurities prior to adding ammonia as, for example, in 2,978,419 Birkhimer (Atlantic Refining) and in 3,012,972 Rule (Du Pont). Additionally, and of closer relevance to the present invention is 3,012,973 Atkins (Du Pont) which teaches the addition of salt in stabilizing sols and specially as sodium chloride, sodium sulfate, etc. The salt containing sols of Atkins may be distinguished from the addition of the free anion of the present invention.

Finally, similar to Atkins, is 3,342,748 Marotta (Monsanto) where to the stable alkaline collodial silica sol are added two salts, one of which is the water soluble salt of a mineral acid.

In the present process the concentrated sols are first freed of sodium and converted to an electrolyte-free sol by contacting the sol with both cation and anion exchange resins as in Mindick above. This sol product, which is in an acidic pH of pH 2–4, is re-alkalized usually with ammonia where the cations become the stabilizing ions of the desired product. Such a procedure is described in Ralph K. Iler, The Colloidal Chemistry of Silica and Silicates, Cornell (1955), page 108. The problem involved with the present invention is that during the alkalization of the electrolyte-free sol, there is often an increase in viscosity coupled with some gelation, which is commercially unfeasible. This problem of the increase in viscosity in the production of silica sols is a genuine one and has made production on a plant-size scale in many cases virtually impossible. Thus, the purpose of the present invention and its realization is to eliminate or lessen this increase in viscosity of highly concentrated sols, and this has been done by maintaining a small concentration of anion or electrolyte in the sol during the alkalization step. This electrolyte or anion is added in sufficient quantity to lessen the viscosity the desired amount but not so much as to destabilize the sol. The free anion or electrolyte is added in an amount of 0.01 to 0.15 weight percent of the anion based on a 50% silica sol product. For comparison purposes, a weight percent based on nitrate has been utilized as a base. The anion component or the anion additive may be selected from inorganic acids such as nitric, hydrochloric, sulfuric, and phosphoric, and in selected cases where the anionic bed is omitted, only a cationic deionization bed is utilized for processing the concentrated sol, then it has been found that a normal amount of anion will suffice and pass through as the desired inorganic cation-free anion.

A preferred starting material utilizable for the present invention is Nalcoag 1050.

NALCOAG 1050

| | |
|---|---|
| Percent colloidal silica as $SiO_2$ | 49–50 |
| pH | 9.0 |
| Viscosity at 77° F., cps. | <30 |
| Specific gravity at 68° F. | 1.385 |
| Average surface area, m.²/gram of $SiO_2$ | 120–150 |
| Average particle size, millimicrons | 20–25 |
| Density, #/gallon at 68° F. | 11.6 |
| Freezing point, deg. F. | 32 |
| $Na_2O$ percent | 0.3 |

EXAMPLE I

About one gallon of an electrolyte-free silica sol was prepared by passing 5 liters of a commercially available sodium stabilized silica sol, Nacoloag 1050, through a two-bed ion exchange column consisting of a top layer of about 1,000 ml. Nalcite HCR–W cation exchange resin in the hydrogen form (this strong acid cation exchange resin is described more fully in U.S. 2,366,007) and a bottom layer of 600 ml. Nalcite SBR anion exchange resin in the hydroxide form. Nalcite SBR is described in U.S. 2,591,573. Alternatives to both the strong acid and strong base resins are set out in Mindick, ante, column 3, line 67–column 4, line 8.

The first 1,000 ml. of Nalcoag 1050 was discarded and the remaining material was collected and has the following properties and characteristics:

| | |
|---|---|
| Percent $SiO_2$ | 50 |
| pH | 3.2 |
| Viscosity, cps. | 15 |
| Conductance, micromhos | 800 |

To this sol was added 11 g. concentrated nitric acid which lowered the pH to 1.8 and raised the conductance to ~6,000 micromhos. This was followed by slow addition of 30% aqueous ammonia until the pH reached 9.5. During this addition the sol was stirred by hand using a glass rod. No clouding or difficulty of gelation was encountered and the viscosity at no time became higher than 30 cps. This ammonium stabilized sol had the following properties:

| | |
|---|---|
| Percent SiO$_2$ | 50 |
| pH | 9.5 |
| Viscosity, cps. | 25 |
| Percent NH$_3$ | 0.35 |
| Percent Na | 0.029 |
| Percent SO$_4$ | <0.001 |
| Percent Cl | <0.001 |

The nitric acid addivitive in this case amounted to 0.02 weight percent of the 50% silica sol product.

The above procedure was repeated but without the addition of nitric acid and the sol became too thick to stir during the addition of the ammonia.

EXAMPLE II

Two gallons of a decationized silica sol was prepared by passing a commercially available sodium stabilized sol, Nalcoag 1050, through about 1500 ml. of Nalcite HCR–W cation exchange resin in the hydrogen form. The decationized sol had the following properties:

| | |
|---|---|
| Percent SiO$_2$ | 50 |
| pH | 1.8 |
| Viscosity, cps. | 8.5 |
| Conductance, micromhos | 5,000 |

To this was added 30% aqueous NH$_3$. The sal was stirred by hand with a glass rod and no difficulty was encountered. The viscosity at no time became greater than 60 cps. The ammonium stabilized sol had the following properties.

| | |
|---|---|
| Percent SiO$_2$ | 50 |
| pH | 9.5 |
| Viscosity, cps. | 55 |
| Percent NH$_3$ | 0.35 |
| Percent Na | 0.04 |
| Percent SO$_4$ | 0.06 |
| Percent Cl | 0.02 |

The embodiments of this invention in which an exclusive property or privilege is claimed are defined as follows:

1. A process for stabilizing a silica sol of pH 2–4 and of high concentration in the range of about 35–50% and which has been substantially deionized by sequential cationic and anionic bed treatment which comprises adding to said sol an anion of an inorganic acid selected from the group consisting of sulfuric, nitric, hydrochloric, and phosphoric in the range of about 0.01 to 0.15 weight percent based upon a 50% silica sol and subsequently alkalinizing by ammoniating said sol.

2. The process according to Claim 1 wherein the anion additive is sulfate.

3. The process according to Claim 1 wherein the anion additive is phosphate.

4. The process according to Claim 1 wherein the anion additive is nitrate.

5. The process according to Claim 1 wherein the anion additive is chloride.

References Cited

UNITED STATES PATENTS

| | | | |
|---|---|---|---|
| 3,582,494 | 6/1971 | Vossos et al. | 252—313 S |
| 3,342,747 | 9/1967 | Mindick et al. | 252—313 S |
| 3,012,973 | 12/1961 | Atkins | 252—313 S |

FOREIGN PATENTS

| | | | |
|---|---|---|---|
| 521,741 | 2/1956 | Canada | 252—313 S |

OTHER REFERENCES

"Mellor's Modern Inorganic Chemistry," revised and edited by G. D. Parkes and J. W. Mellor, Longmans, Green and Co., New York (1939), p. 400.

RICHARD D. LOVERING, Primary Examiner

U.S. Cl. X.R.

106—287 S